(12) United States Patent
Rillema et al.

(10) Patent No.: US 10,246,269 B2
(45) Date of Patent: Apr. 2, 2019

(54) BOTTLE RETAINING ASSEMBLY WITH QUICK RELEASE FOR A BOTTLE FILLER

(71) Applicant: Fogg Filler Company, Holland, MI (US)

(72) Inventors: Larry Rillema, Zeeland, MI (US); John Wilks, Holland, MI (US)

(73) Assignee: Fogg Filler Company, Holland, MI (US)

( * ) Notice: Subject to any disclaimer, the term of this patent is extended or adjusted under 35 U.S.C. 154(b) by 0 days.

(21) Appl. No.: 15/465,907

(22) Filed: Mar. 22, 2017

(65) Prior Publication Data
US 2018/0273368 A1 Sep. 27, 2018

(51) Int. Cl.
*B65G 47/84* (2006.01)
*B65G 47/86* (2006.01)
*B67C 3/24* (2006.01)

(52) U.S. Cl.
CPC ............ *B65G 47/847* (2013.01); *B67C 3/242* (2013.01); *B65G 2201/0244* (2013.01)

(58) Field of Classification Search
CPC .......... B65G 47/847; B65G 2201/0244; B67C 3/24; B67C 3/242; B67C 3/244; B67C 3/246; B67C 3/248
USPC ............. 198/867.01, 867.08, 867.15, 803.11
See application file for complete search history.

(56) References Cited

U.S. PATENT DOCUMENTS

| 5,607,045 | A | * | 3/1997 | Hermann Kronseder | ................... B08B 9/42 198/476.1 |
| 5,778,633 | A | * | 7/1998 | Sweeny | ................ B65B 43/60 53/201 |
| 8,047,830 | B2 | * | 11/2011 | Kiefl | ....................... B29C 49/42 198/867.11 |
| 8,225,923 | B2 | * | 7/2012 | Fahldieck | .............. B65G 29/00 198/470.1 |
| 8,939,746 | B2 | * | 1/2015 | Blochmann | ............ B29C 49/42 198/867.11 |
| 8,973,745 | B2 | * | 3/2015 | Scheibenpflug | ........ B65B 43/60 198/465.1 |
| 9,120,665 | B1 | * | 9/2015 | Fogg | ...................... B67C 3/242 |
| 9,388,036 | B2 | * | 7/2016 | Fogg | ...................... B67D 7/84 |
| 9,446,909 | B2 | * | 9/2016 | Singur | ................ B65G 47/847 |
| 9,517,898 | B2 | * | 12/2016 | Fahldieck | ............ B65G 47/847 |
| 9,670,045 | B2 | * | 6/2017 | Riggio | .................... B67C 3/202 |

* cited by examiner

*Primary Examiner* — Gene O Crawford
*Assistant Examiner* — Keith R Campbell
(74) *Attorney, Agent, or Firm* — The Watson IP Group, PLC; Jovan N. Jovanovic (57) ABSTRACT

A bottle retaining assembly for a filler including a lifter coupling and a retaining structure. The lifter coupling has an upper support structure attachable to a base of a bottle lifter assembly. The retaining structure has an upstand structure that is positionable in engagement with the upper support structure. The upper support structure includes a releasable locking member structurally configured to releasably lock the upper support structure of the lifter coupling to the upstand structure. The releasable locking member is actuatable without the use of a tool.

7 Claims, 8 Drawing Sheets

BOTTLE RETAINING ASSEMBLY WITH QUICK RELEASE FOR A BOTTLE FILLER

CROSS-REFERENCE TO RELATED APPLICATION

N/A

BACKGROUND OF THE DISCLOSURE

1. Field of the Disclosure

The disclosure relates in general to filling equipment suitable for filling bottles and the like with a flowable material, and more particularly, to a bottle retaining and alignment assembly with a quick release functionality to allow for the quick adaptability of the filler to differently sized, shaped and/or otherwise configured bottles.

2. Background Art

The use of filling equipment is well known in the art for the filling of bottles and the like with a flowable material. The bottles in many instances comprise rigid packaging (although not required) and the flowable material comprises a liquid, juice, syrup, oil, or other material that can be delivered through a valve into the bottle. Generally, the filling equipment includes a plurality of filling stations, each having an assembly to retain the bottle and a valve to fill the bottle. These two structures rotate about an axis of rotation that is generally spaced apart from the filling stations and centrally located. The filling stations include components that are specifically configured for the filling of a particular bottle configuration. In the event that a different bottle (i.e., differently sized, shaped and/or otherwise configured) is to be filled, it is necessary to disassemble each of the filling stations, and to replace components at each filling station in order to accommodate the different bottle.

Problematically, such changeovers, as they are typically referred to in the industry, result in downtime for the filler. This downtime can be significant where there are a number of filling stations, which can be dozens. In many instances, the changeover may not be authorized because too small of a batch of the second size bottle is to be filled, and the cost of the downtime renders the project unprofitable.

Additionally, there are problems even where a changeover is acceptable. For example, often multiple tools are required to execute the changes at the filler stations. In other instances, a number of fasteners are required, as are specific structures that must be fastened together. This can lead to part misplacement, assembly difficulties and requires increased training and skill for the operator.

SUMMARY OF THE DISCLOSURE

The disclosure is directed to a bottle retaining assembly for a filler comprising a lifter coupling and a retaining structure. The lifter coupling having an upper support structure attachable to a base of a bottle lifter assembly. The retaining structure having an upstand structure that is positionable in engagement with the upper support structure. The upper support structure includes a releasable locking member structurally configured to releasably lock the upper support structure of the lifter coupling to the upstand structure. The releasable locking member is actuatable without the use of a tool.

In some configurations, the upper support structure includes a front face and the upstand structure includes an inner face. The inner face of the upstand structure positionable so as to overlie the front face of the upstand structure and to be slidably movable thereagainst.

In some configurations, the upper support structure further includes at least one alignment guide including a pin extending from the front face. The releasable locking member comprises a locking pin positionable between a locked and an unlocked configuration. The locking pin is slidably movable within a bore defined in the upper support structure. The upstand structure further includes an alignment portion corresponding to the at least one alignment guide. The alignment portion includes an entry portion and a locking portion. The pin is insertable into the entry portion, and upon slidable movement of the upper support structure and the upstand structure, the pin is directed into a locking portion, to releasably couple the upstand structure and the upper support structure.

In some configurations, the locking pin of the releasable locking member further includes a locking portion and an unlocked portion at a first end thereof, and the upstand structure includes a locking member opening. Placement of the releasable locking member in a first orientation interfaces the unlocked portion of the locking pin with the locking member opening, allowing relative slidable movement of the upstand structure relative to the upper support structure, defining an unlocked configuration. Placement of the releasable locking member in a second orientation interfaces the locked portion of the locking pin with the locking member opening, precluding relative slidable movement of the upstand structure relative to the upper support structure, defining a locked configuration.

In some configurations, the releasable locking member further includes a biasing member directing the locking pin to interface the locked portion with the locking member opening.

In some configurations, the alignment guide includes an upper pin and a lower pin spaced apart from the upper pin.

In some configurations, the locking pin is positioned between the upper pin and the lower pin.

In some configurations, each of the locking pin, the upper pin and the lower pin are substantially parallel to each other.

In some configurations, the locking pin, the upper pin and the lower pin are substantially perpendicular to the front face of the upper support structure.

In another aspect of the disclosure, the disclosure is directed to a bottle retaining assembly including an upper support structure and a retaining structure. The upper support structure is attachable to a bottle lifter assembly. The retaining structure is releasably attachable to the upper support structure. The retaining structure has an upstand structure and a bottle upper portion positioning structure. The upper support structure and the retaining structure are slidably movable relative to each other into operable engagement, with a releasable locking member retaining the operable engagement. The releasable locking member is movable between a locked configuration and an unlocked configuration allowing for the upper support structure to be disengaged from the upstand structure, by hand without the use of a tool.

In some configurations, the releasable locking member comprises a locking pin that is slidably movable relative to the upper support structure, between a locked configuration and an unlocked configuration.

In some configurations, the locking pin is biased toward the locked configuration, and depression of the locking pin directs the locking pin to the unlocked configuration.

In another aspect of the disclosure, the disclosure is directed to a method of attaching an retaining structure to an upper support structure comprising the steps of: providing an upper support structure attached to a bottle lifter assembly; providing an retaining structure having an upstand structure and a bottle upper portion positioning structure coupled thereto; slidably positioning the upstand structure relative to the upper support structure into operable engagement; and slidably moving a locking pin of a releasable locking member associated with the upper support structure into an opening of the upstand structure, to, in turn, releasably retain the same in operable engagement.

In some configurations, the method further includes the steps of depressing, by hand and without the need for a tool, the locking pin relative to the upper support structure to direct the locking pin out of the opening of the upstand structure; and slidably decoupling the upstand structure from the upper support structure.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
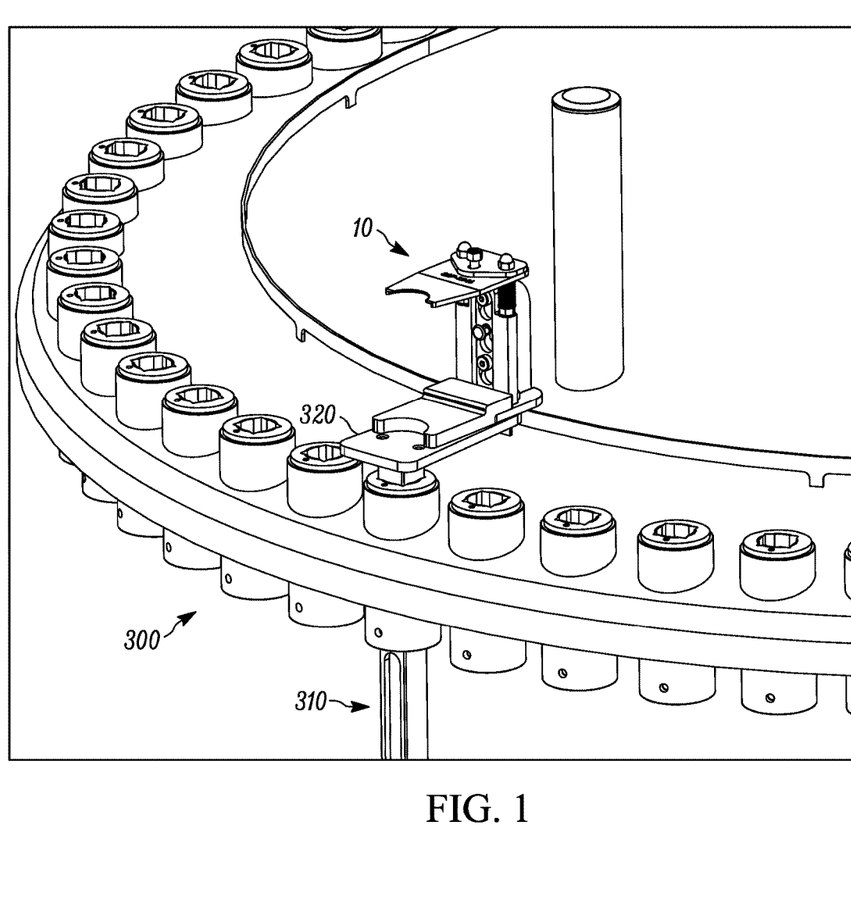
FIG. 1 of the drawings is a perspective view of a portion of a filler having a bottle lifter assembly (while it will be understood that the bottle filler may have a plurality of bottle lifter assemblies which were removed for purposes of pictorial clarity)
Figure 2:
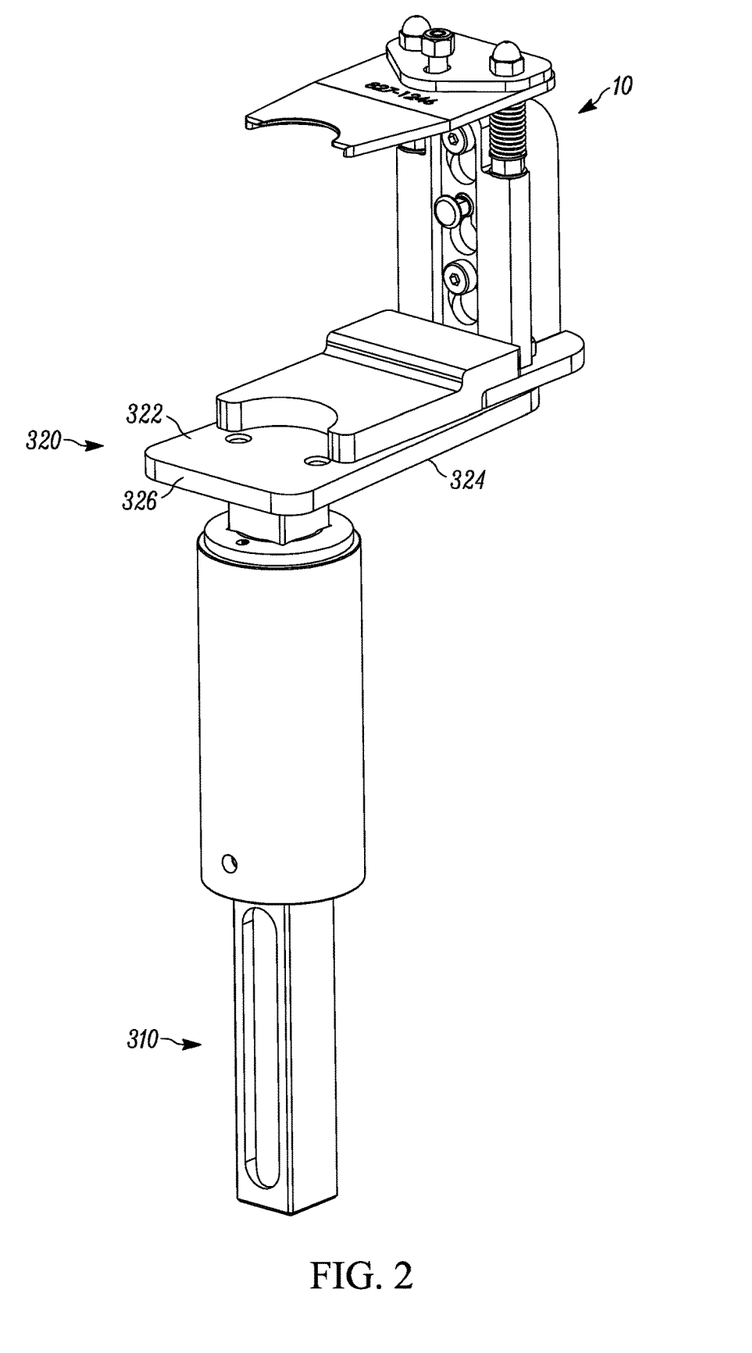
FIG. 2 of the drawings is a perspective view of a bottle lifter assembly having the bottle retaining assembly with quick release for a bottle filler of the present disclosure.

Referring now to the drawings and in particular to FIGS. 1 and 2, the bottle retaining assembly with quick release for use in association with a filler is shown generally at 10. The assembly is configured to use with any number of different fillers, including, but not limited to the fillers sold and marketed by Fogg Filler Company, of Holland, Mich. Of course, the same principles and structures can be adapted for use in other fillers that fill various types of flowable material into containers, such as, but not limited to bottles and other rigid containers. It will be understood that a typical filler may include anywhere from one to over one hundred filler heads, or more. It will be understood that any one or more of these assemblies can be utilized with such a filler or fillers. For example, a single overall assembly may be provided with a number of upper bottle retaining structures (along with corresponding pin members), sized for differently dimensioned bottles. As such, and as will be explained, a single lower bottle retaining structure (with corresponding releasable locking structures coupled thereto) can be provided a with an entire set of differently configured upper bottle retaining structures and corresponding pin members. As such, the user can quickly change the fillers to fill differently sized and/or shaped bottles. This change can occur without the need of a tool, much less the disassembly of small fasteners and the like with conventional or specialized tools. Significantly, the removable component includes the capability of bottle positioning, neck alignment, neck support and fill valve opening and closing (without a bottle), while allowing for tool-less removal and replacement to accommodate differently sized containers that may be run on such equipment, while being attachable to a lifter rod.

In one example, a base of a filler 300 is shown with the understanding that such a filler has additional features and the like. One example of a filler is a Fogg Filler Model F6.2 manufactured and sold by Fogg Filler Company of Holland, Mich. Of course, use in association with other fillers, both of Fogg Filler Company as well as others, is contemplated. To simplify the drawings, a single lifter assembly 310 is shown, with the understanding that a plurality of lifter assemblies are utilized on such a bottle filler. The bottle lifter assembly includes a movable base 320 having a top surface 322, a bottom surface 324 and an outer perimeter 326. As will be understood, a cam or other device (such as hydraulic or pneumatic equipment, or another mechanical coupling) directs the bottle lifters in a upward and downward direction as the filler rotates. In some configurations, the bottle lifter assemblies can rotate about the filler.

Figure 3:
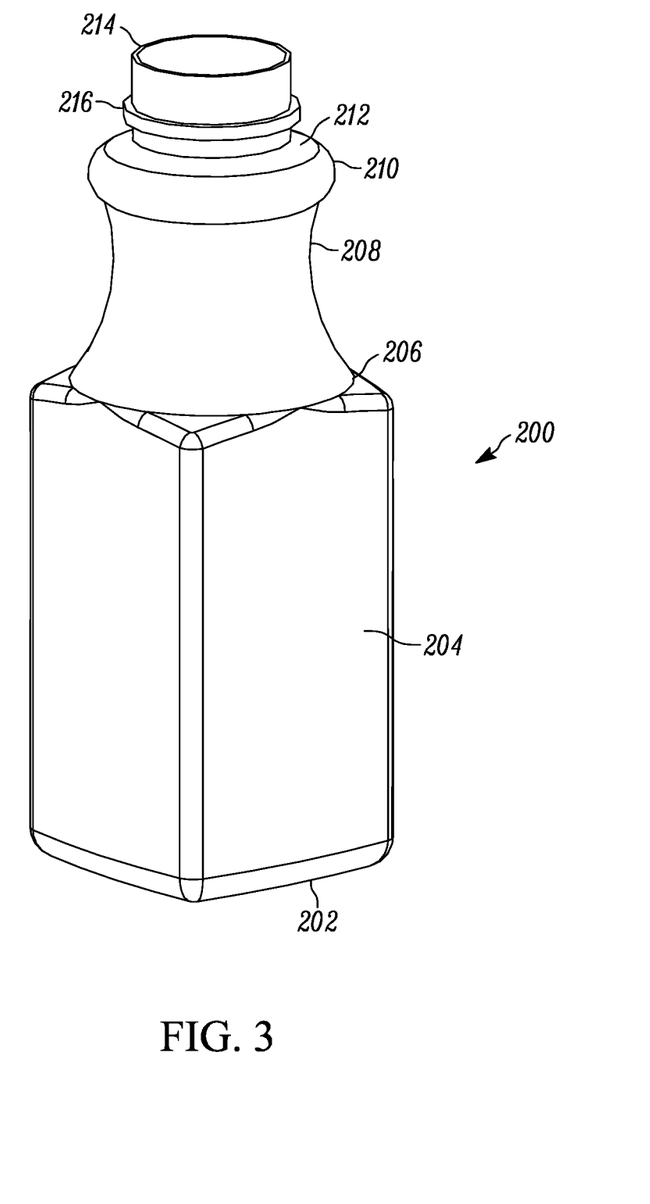
FIG. 3 of the drawings is an exemplary bottle with which the bottle retaining assembly with quick release for a bottle filler can be associated.

With reference to FIGS. 1 and 2, the assembly is shown with a bottle 200 positioned in an operable position within the assembly. It will be understood that different bottles have different configurations, capacities, shapes and dimensions. Such bottles typically include a structure shown, with greater specificity, in FIG. 3 as comprising base 202, body 204, shoulder 206, neck 208 and finish 210. The finish 210 includes collar 212, lip 214 and threads 216. The collar includes lower portion 217. The collar provides a base for bottoming out a cap that can be threaded onto the threads 216, as well as a register against which grasping structures can be utilized. In other configurations, the shape may appear different, and other closure mechanisms may be employed, structures that are other than threads (such as press fit configurations, crimped connections, clasps, and other structures). Portions of the shoulder upward generally form the upper portion of the bottles. It will be understood that the body, shoulder and or neck may include various handles or other structures. The bottles may be formed from any number of different materials, including but not limited to plastic, glass, composites and the like. The particular shape of the bottle is not to be deemed limiting, and, the configuration of bottles that can be utilized with such an assembly is without limitation.

The bottle retaining assembly with quick release for a bottle filler 10 includes lifter coupling 20, and retaining structure 22. It will be understood that a plurality of such assemblies 10 may be incorporated into a single filler. It will further be understood that while the construction of the retaining structure is that which is generally shown in U.S. Pat. No. 9,120,665 issued to Fogg, et al, and U.S. Pat. No. 9,388,036 issued to Fogg, et al., it is contemplated that other retaining structures can be utilized, such as those that may be rigid, and fixed or others that may be adjustable.

The lifter coupling 20 is shown in FIGS. 4 through 7 as comprising base 30 and upper support structure 32. The base 30 includes upper surface 34, lower surface 36 and a plurality of openings, such as openings 38. The upper support structure 32 is defined by proximal end 40, distal end 41 and front face 42. The upper support structure is attached to and extends from base 30 substantially perpendicularly proximate a central axis of the base 30. It will be understood that the upper support structure is secured by fasteners that extend through openings 38 on the base 30 and into the upper support structure.

Figure 6:
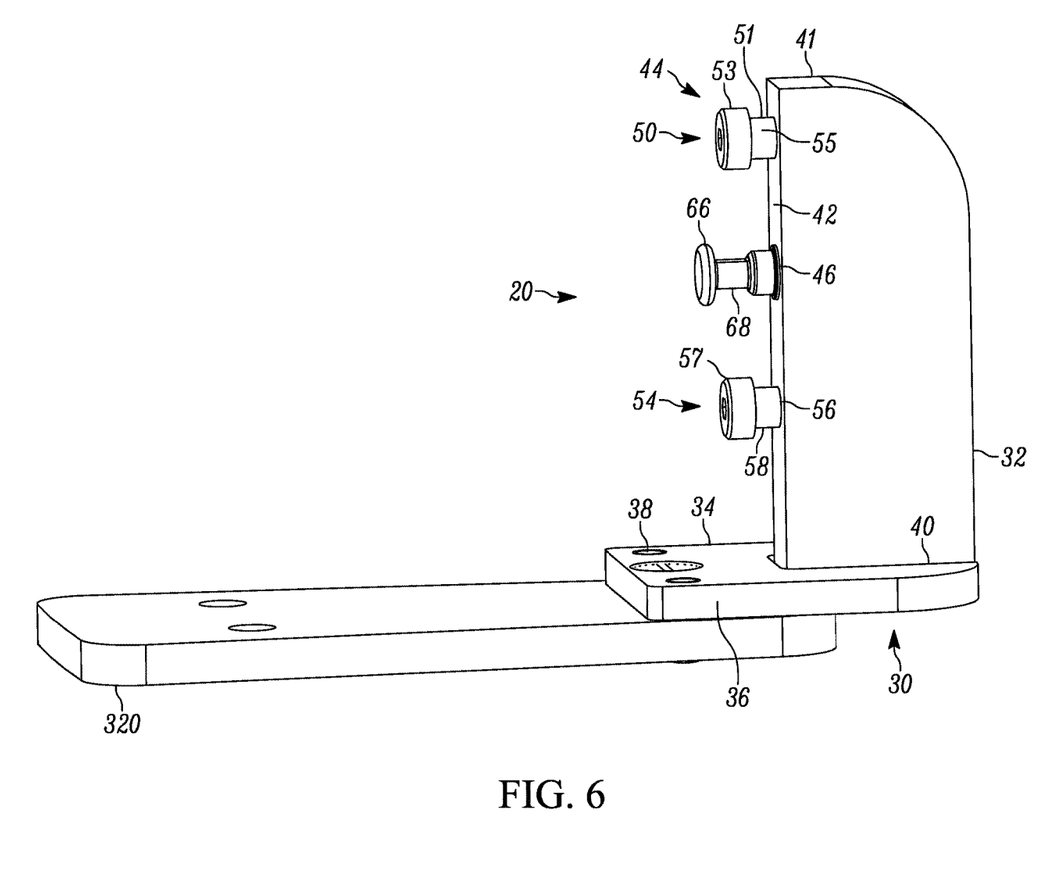
FIG. 6 of the drawings is a perspective view of the lifter coupling of bottle retaining assembly with quick release of the present disclosure, mounted to a movable base.

As is shown in FIG. 6, among others, the lower surface 36 of the base 30 is mated to the movable base 320. The openings extended from the upper surface 34 to the lower surface 36 and opposite, depending on the directions the screws are to be placed through. Openings 38 proximal to the base 30 are axially aligned with holes on the movable base 320 for screw fixation. Openings 38 are also axially aligned with the upper support structure 32 to allow dual fixation with fasteners.

The upper support structure 32 further includes locking member bore 43, alignment guides 44 and releasable locking member 46. As set forth above, the proximal end 40 mates with the upper surface 34 of the base 30, secured by fasteners or the like. The distal end 41 is spaced apart from the proximal end and spaced apart from the base 30. The front face 42 faces is substantially perpendicular to the movable base 320, conjoining substantially perpendicular with the proximal end 40 and distal end 41.

The locking member bore 43, alignment guides 44, and the releasable locking member 46 are defined on the front face 42. The locking member bore 43 extends into the upper support structure 32 such that it is substantially perpendicular to the front face.

Figure 7:
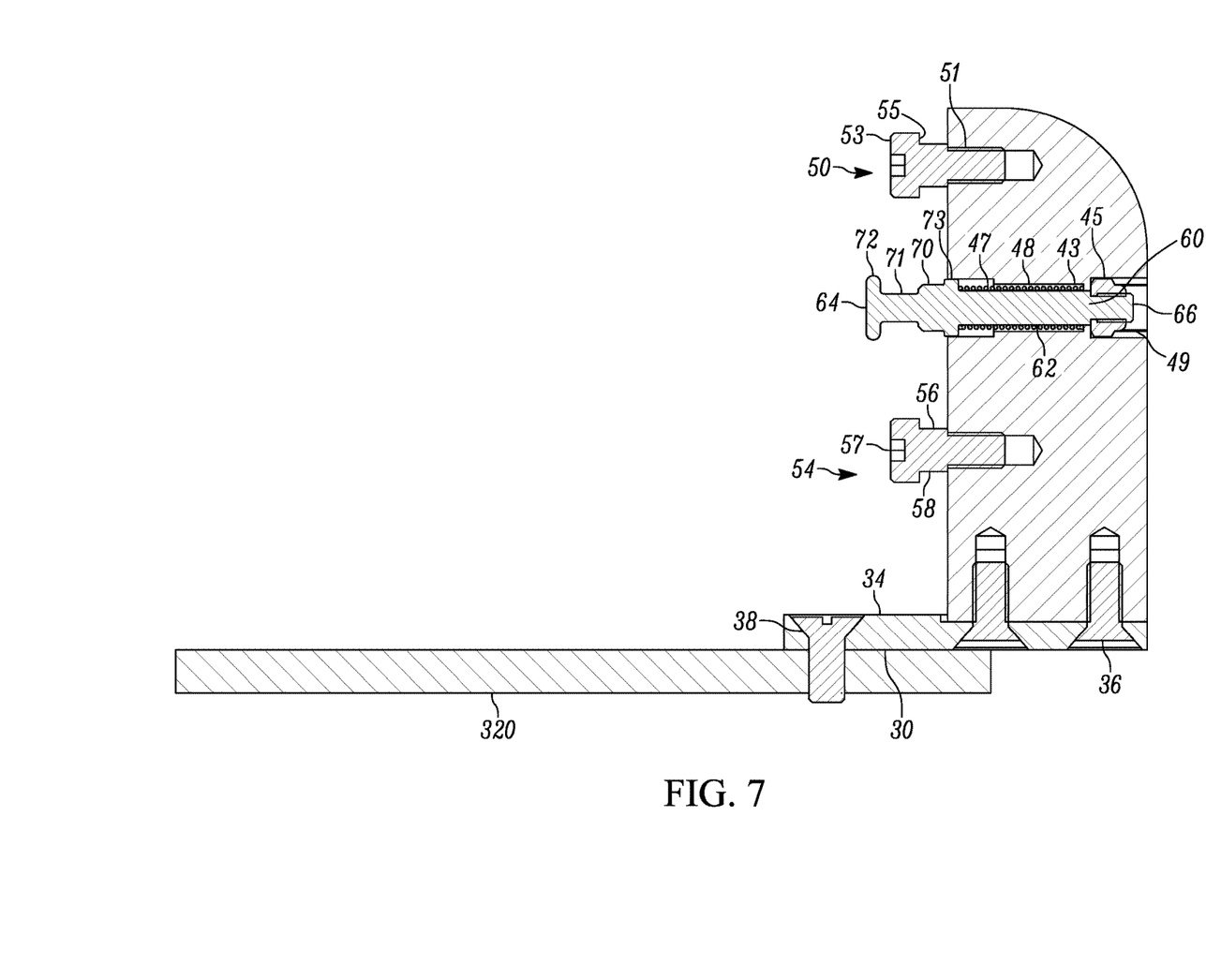
FIG. 7 of the drawings is a cross-sectional view of the lifter coupling of a bottle retaining assembly with quick release of the present disclosure, mounted to a movable base.

The locking member bore 43 includes inner portion 47, central portion 48 and outer portion 49. A flange 45 is inwardly directed and positioned proximate the interface between the outer portion 49 and the central portion 48. As will be explained hereinbelow, the releasable locking member 46 slidably moves within the locking member bore 43.

As will be explained below, the alignment guides 44 and releasable locking member 46 interact directly with the retaining structure 22 to releasably retain the same in the desired operable position. The alignment guides 44 include upper pin 50 and lower pin 54 that extend outwardly from the front face 42. The upper pin 50 protrudes proximate the distal end 41 and the lower pin 54 protrudes proximate the proximal end 40.

The upper pin 50 has an inner portion 51, outer portion 53, and shoulder 55. The inner portion 51 mates with the upper support structure 32 through an axial opening. The outer portion 53 is the head of upper pin that allows an external tool to attach and adjust the pin as is required. The shoulder 55 is the conjoining element along the axis of the inner portion 51 and outer portion 53. The shoulder 55 has an increased diameter in relation to the inner portion 51, while remaining axially aligned.

The lower pin 54 has an inner portion 56, outer portion 57, and shoulder 58. The inner portion 56 mates with the upper support structure 32 through an axial opening. The outer portion 57 is the head of upper pin that allows an external tool to attach and adjust the pin as is required. The shoulder 58 is the conjoining element along the axis of the inner portion 56 and outer portion 57. The shoulder 58 has an increased diameter in relation to the inner portion 56, while remaining axially aligned.

It is to be understood that the upper pin 50 and lower pin 54 can be adjusted through an external tool. Both the upper pin 50 and lower pin 54 are axially aligned to openings in the upper support structure 32 and are axially aligned in relation to one another. For example, the openings may be threaded, with the upper and lower pin being threadedly coupled thereto The releasable locking member 46 includes locking pin 60 and biasing member 62. The locking pin 60 extends through the locking member bore 43 and includes first end 64, second end 66 and retaining portion 68. The retaining portion 68 is defined at the first end 64 and includes locking portion 70, unlocked portion 71, outer shoulder 72 and biasing flange 73. The second end includes a fastener 74. It will be understood that the fastener and retaining portion are larger in cross-section than the central portion 48 of the locking member bore 43. As such, the fastener 74 limits further inward movement of the locking pin 60, and the retaining portion 68 limits further outward movement of the locking pin 60.

With reference to FIG. 7, the biasing member has a first end that faces the biasing flange 73 and a second end that faces the flange 45 of the locking member bore. In the configuration shown, the biasing member 62 forces the locking pin 60 inwardly until the fastener 74 rests against the central portion 48 and is within the outer portion 49. In such a configuration, the locking portion 70 extends out of the inner portion 47 as does substantially the remainder of the retaining portion. It will be understood, and explained below in greater detail, that the retaining portion 68 can be pushed inwardly to overcome the biasing member 62 thereby directing the retaining portion 68 inwardly so as to place at least the locking portion 70 into the inner portion 47 of the locking member bore, leaving the unlocked portion 71 outside of the inner portion of the locking member bore. Release of the locking pin allows the biasing member to force the locking pin back inwardly so that the fastener 74 again rests against the central portion 48 and the locking portion 70 extends out of the inner portion 47 of the locking member bore. In other configurations, instead of such a pin, a bayonet lock or a twistlock is contemplated for use.

Figure 4:
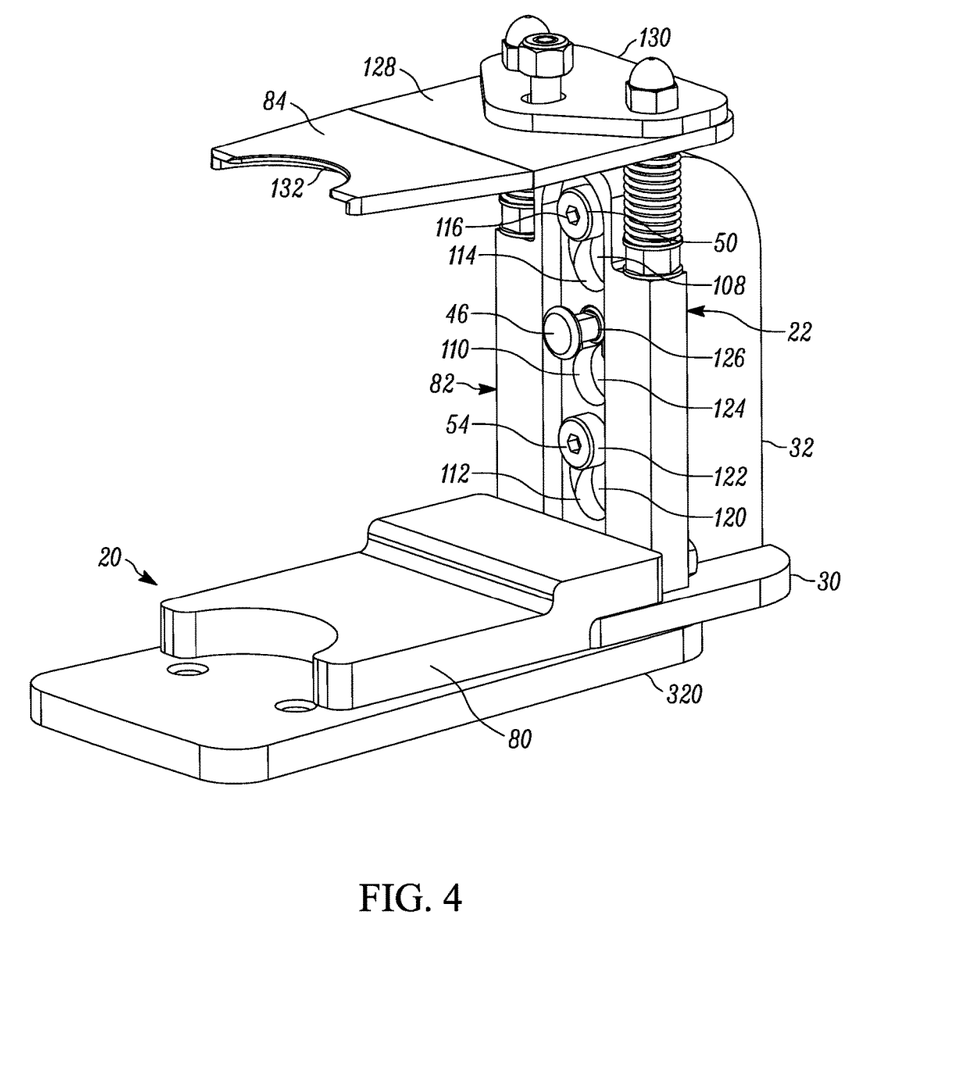
FIG. 4 of the drawings is a perspective view of the bottle retaining assembly with quick release of the present disclosure, mounted to a movable base.
Figure 5:
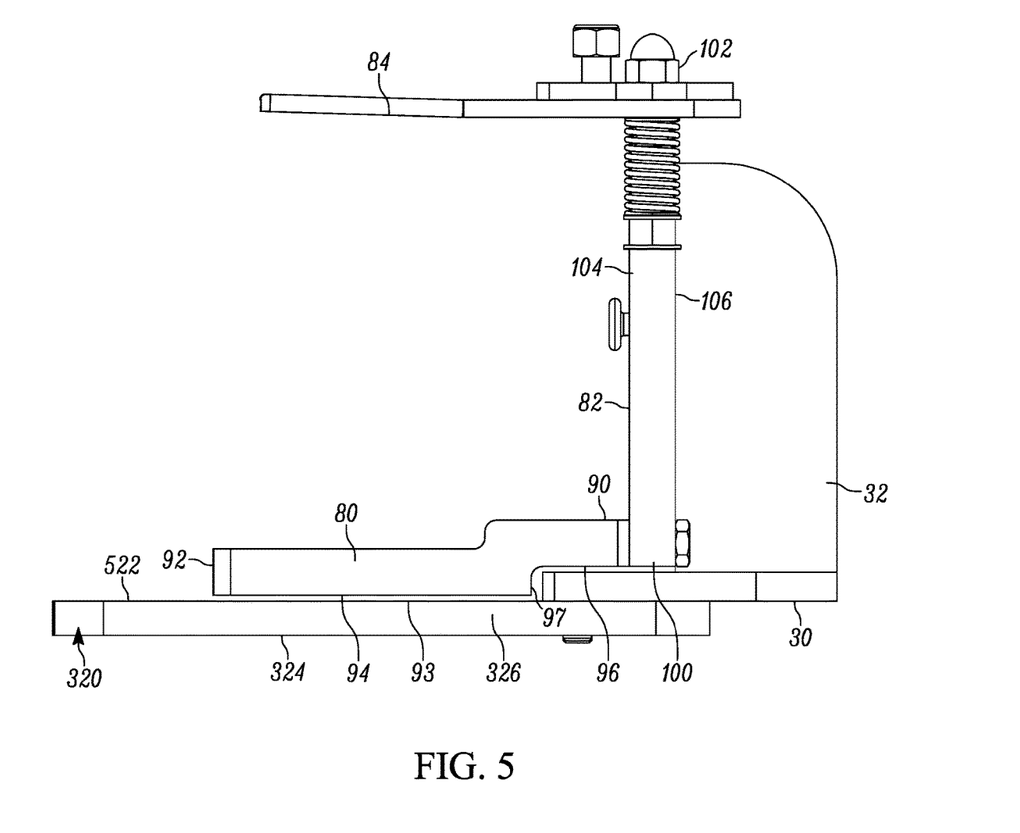
FIG. 5 of the drawings is a side elevational view of the bottle retaining assembly with quick release of the present disclosure, mounted to a movable base.
Figure 8:
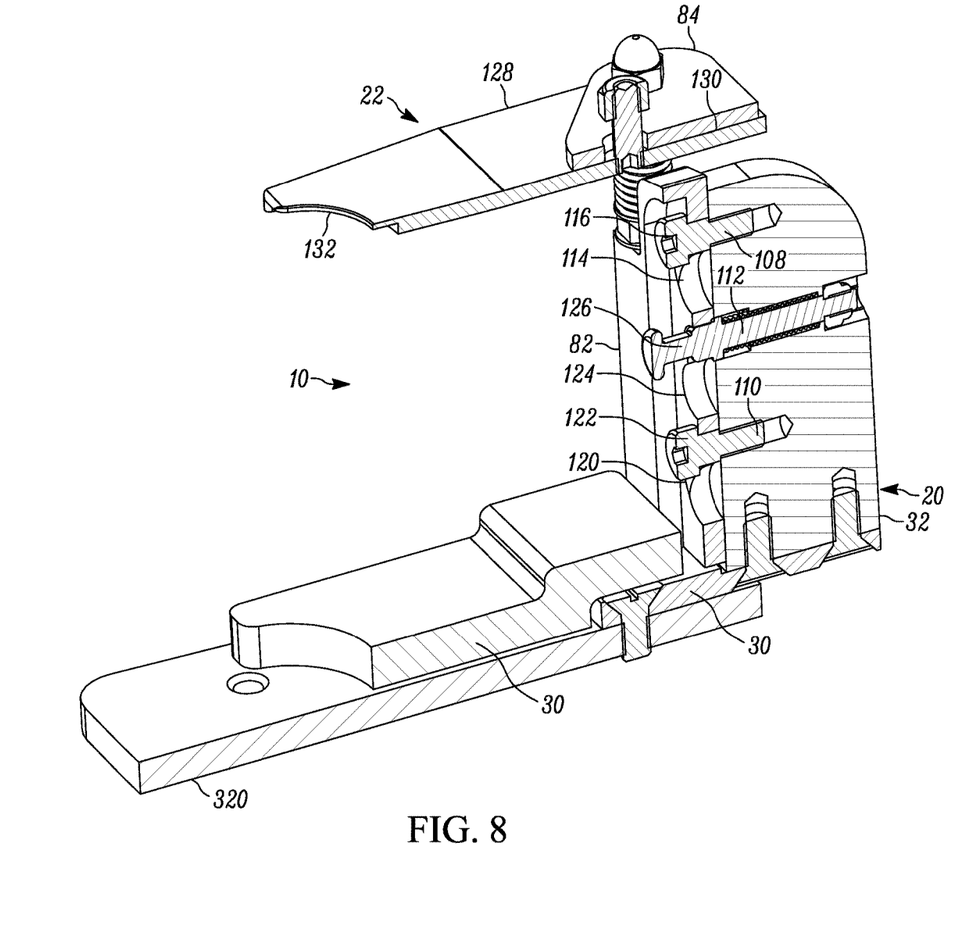
FIG. 8 of the drawings is a perspective cross-sectional view of the bottle retaining assembly of the present disclosure, mounted to a movable base.

The retaining structure 22 is shown in FIGS. 4, 5, and 8. The retaining structure 22 supports and hold the bottles while the device is in operation and the filling equipment is filling bottles and the like. The retaining structure includes a lower bottle positioning structure 80, upstand structure 82, and bottle upper portion positioning structure 84. As will be explained, the retaining structure is secured to the lifter coupling 20 via the alignment guides 43 and releasable locking member 46. This mates with the upstand structure 82 through a tangential and mated relation. The upper pin 50 and lower pin 54 are secured to the upper support structure with the upstand structure 82 in between the pins and the front face 42. This creates a tight fit relation, mating the outer face 106 with the front face 42.

The lower bottle positioning structure 80 is located proximal in relation to the base 30 of the lifter coupling 20, and, attaches to the proximal end of the upstand structure 82 generally perpendicularly via fasteners situated on opposite ends of the lower bottle positioning structure 80. The lower bottle positioning structure includes an inner end 90, outer end 92, and lower surface 94. The inner end 90 is mated to the upstand structure 82 and includes openings defined therein that can receive fasteners. The outer end 92 is opposite and parallel the inner end 90, containing a radial curve meant to hold a variable bottle body 204. It is to be noted that the curvature can change for altering bottle sizes, structures, materials, or other such variables. The lower surface 94 is made of the outer portion 95, inner portion 96, and step-up 97. The outer portion 95 of the lower surface 94 is parallel to the movable base, but does not mate with the material. Likewise, the inner portion 95 is parallel to the upper surface 34 of base 30 to the lifter coupling 20. These are connected via a perpendicular surface designated as the step-up 97.

The upstand structure 80 includes a lower end 100, upper end 102, inner face 104, outer face 106, upper alignment portion 108, lower alignment portion 110, and locking member opening 112. The upstand structure 82 is located in between the lower bottle positioning structure 80 and the bottle upper portion positioning structure 84, perpendicular to both devices. It is mated and parallel to the upper support structure 32 of the lifter coupling 20. More specifically, the lower end 100 mates with the upper surface 34 of the lifter coupling 20 base 34. The upper end 102 is substantially parallel and opposite mated with the bottle upper portion positioning structure 84, containing openings for two springs axially aligned with the holes. The outer face 106 is mated with the front face 42 of the upper support structure 32 to the lifter coupling 20. It extends from the lower end 100 to the upper end 102. The inner face 104 is opposite and parallel the outer face 106, containing the bored holes that the upper pin 50, lower pin 54, and releasable locking member 46 feed through, in order to secure the retaining structure 22 to the lifter coupling 20.

The outer face 106 includes upper alignment portion 108, lower alignment portion 110, and the locking member opening 112. The portions are generally aligned axially to one another, having, in the configuration shown, a spacing equal to that of the upper pin 50, lower pin 54, and releasable locking member 46 of the upper support structure 32. The upper alignment portion 108 has an entry portion 114 and locking portion 116. The locking portion 116 is above and axially aligned about the entry portion 114, having an inner diameter greater than the inner portion 51 of the upper pin 50, but smaller than the shoulder 55 of the same pin. The lower alignment portion 110 has an entry portion 120 and locking portion 122. The locking portion 122 is above and axially aligned about the entry portion 120, having an inner diameter greater than the inner portion 56 of the lower pin 54, but smaller than the shoulder 58 of the same pin. The locking member opening 112 has two portions, the entry portion 124 and locking portion 126. The locking portion 126 is located above and axially aligned to the entry portion 124. The locking portion has a larger diameter than the retaining port 68, but a smaller diameter referenced to the second end 66 of the releasable locking member 46. As will be explained with respect to the method, the ports are configured to allow the pins to be slid through the entry portions simultaneously before being lowered towards the proximal end 40 of the upper support structure 32, moving indicated pins into locking portions. This action results in an axial alignment between the locking portions and the indicated pins, further enforced by mates of the inner face 104 to the front face 42 of the upper support structure 32.

The bottle upper portion positioning structure 84 is located most distal to the bottle retaining assembly 10. It consists of an upper plate 128 that has openings allowing for securing the upstand structure 82 to the inner end 130. The upper plate 128 is made of an inner end 130 and bottle interfacing end 132. The inner end 130 is the point of contact with the upstand structure 82, with two spring stands allotting for deflection of plate without strain on the upper portion positioning structure 84 or upstand structure 82. The bottle interference end 132 is curved in a way that allows for the neck 208 of the bottle 200. It will be understood that the curvature of the bottle interfacing end can be altered in a way that allows for different bottle materials, sizes, structures, and other variables that coincide with lifting and filling said bottles 200. As set forth above, such a configuration is disclosed in the above referenced patents, namely, U.S. Pat. No. 9,120,665 issued to Fogg, et al, and U.S. Pat. No. 9,388,036 issued to Fogg, et al., and, it is contemplated that other bottle retaining structures having different features are suitable for use as well.

To assemble the retaining structure 22 onto the lifter coupling 20, the user is first provided with the retaining structure. It will be understood that a single filler may include a plurality of filler heads and a plurality of bottle lifter assemblies, each one of which is to be mated with the retaining structure. It will further be understood that complete sets of retaining structures can be supplied so that the filler can be modified to fill containers of different sizes. Indeed, there is little limitation as to the number of different retaining structures that can be supplied and coupled to a single filler. It is further contemplated that in other configurations, the movable base may be a quick connect mechanism to the lifter shaft, and that the entire structure can be coupled to the lifter without the use of a tool.

Initially, the upstand structure 82 is positioned so that the inner face 104 overlies the front face 42 of the upper support structure 32. Once overlying, the alignment guides 44 and releasable locking member 46 are aligned with the respective one of the upper alignment portion 108, lower alignment portion 110 and locking member opening 112. More specifically, the upper pin is aligned with the entry portion 114 of the upper alignment portion; the lower pin 54 is aligned with the entry portion 120 of the lower alignment portion; and, the releasable locking member is aligned with the locking member opening 112. Once aligned, the pins are directed into the entry portions, and, the locking pin of the releasable locking member is directed into the entry portion 124.

Once the pins and the locking pin are introduced into the entry portion of the respective alignment portions and openings, the locking pin is depressed. As the locking pin is depressed, the biasing member is overcome, and the first end is directed into the locking member bore. Eventually, the locking portion 70 is inserted into the inner portion 47 of the locking member bore 43. At such time, it is possible to slidably move the upstand structure 82 downward relative to the upper support structure toward the base of the lifter coupling. Through this downward movement, the upper pin 50 is directed into the locking portion 116 of the upper alignment portion 108; the lower pin 54 is directed into the locking portion 122 of the lower alignment portion 110; and the locking pin 60 is directed into the locking portion 126 of the locking member opening 112.

Next, the locking pin 60 is released, whereby the biasing member drives the locking pin within the locking member bore so that the locking portion 70 exits from within the inner portion 47 of the locking member bore and is in engagement with the locking portion 126 of the locking member opening.

It will be understood that the outer portion 53 of the upper pin 50 is larger than the locking portion 116 of the upper alignment portion. The outer portion 57 of the lower pin 54 is larger than the locking portion 122 of the lower alignment portion. Finally, the outer shoulder 72 is larger than the locking portion 126 of the locking member opening 112. Moreover, due to the configuration of the locking portion 70 of the locking pin 60 relative to the configuration of the locking member opening, slidable movement of the upstand structure 82 relative to the upper support structure 32 is prohibited as long as the locking portion 70 of the locking pin 60 engages the locking portion 126 of the locking member opening 112. The two structures are therefore in locked engagement.

To separate the structures from each other, the user essentially decouples the locking pin 60 from the locking portion 126 of the locking member opening, thereby allowing relative slidable movement. In greater detail, the user can depress the locking pin 60 so as to overcome the biasing member 62 and to direct the locking portion 70 into the inner portion 47 of the locking member bore. With the releasable locking member being in an unlocked position, the upstand structure can again slidably move relative to the upper support structure. In turn, the upper and lower pins can be positioned into corresponding entry portions of the upper and lower alignment portions, and, the upstand structure can be pulled away from the upper support structure. This movement dislodges the pins from the alignment portions disconnecting the two devices.

Advantageously, the coupling and decoupling of the upstand structure and the upper support structure can be achieved through without the use of a tool or without manipulation of fasteners such as threaded fasteners. As such, the user can quickly couple and uncouple the two structures. As an example, for a filler having 60 heads, where conventional bottle retaining structures are coupled to the lifter assemblies, there may be two or more fasteners for each such structure. In turn, for a bottle change, it may be necessary to remove and refasten over a hundred and twenty fasteners, each one of which consumes time for alignment, threading, tightening and confirmation. To the contrary, with the assembly of the present disclosure, each one of the bottle retaining structures can be easily and quickly removed and replaced merely by relative movement and the depression of the releasable locking member. Thus, a changeover of a filler from the filling of a first type of bottle to a second type of bottle can be achieved quickly and without tools, even for a relatively large filer.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A bottle retaining assembly for a filler comprising:
a lifter coupling having an upper support structure attachable to a base of a bottle lifter assembly;
a retaining structure having an upstand structure that is positionable in engagement with the upper support structure,
wherein the upper support structure includes a releasable locking member structurally configured to releasably lock the upper support structure of the lifter coupling to the upstand structure, wherein the releasable locking member is actuatable without the use of a tool,
wherein the upper support structure includes a front face and the upstand structure includes an inner face, with the inner face of the upstand structure positionable so as to overlie the front face of the upstand structure and to be slidably movable thereagainst, and
wherein the upper support structure further includes at least one alignment guide including a pin extending from the front face, with the releasable locking member comprising a locking pin positionable between a locked and an unlocked configuration, the locking pin slidably movable within a bore defined in the upper support structure, the upstand structure further including an alignment portion corresponding to the at least one alignment guide, the alignment portion including an entry portion and a locking portion, wherein the pin is insertable into the entry portion, and upon slidable movement of the upper support structure and the upstand structure, the pin is directed into a locking portion, to releasably couple the upstand structure and the upper support structure.

2. The bottle retaining assembly of claim 1 wherein the locking pin of the releasable locking member further includes a locking portion and an unlocked portion at a first end thereof, and the upstand structure includes a locking member opening, whereupon placement of the releasable locking member in a first orientation interfaces the unlocked portion of the locking pin with the locking member opening, allowing relative slidable movement of the upstand structure relative to the upper support structure, defining an unlocked configuration, and whereupon placement of the releasable locking member in a second orientation interfaces the locked portion of the locking pin with the locking member opening, precluding relative slidable movement of the upstand structure relative to the upper support structure, defining a locked configuration.

3. The bottle retaining assembly of claim 2 wherein the releasable locking member further includes a biasing member directing the locking pin to interface the locked portion with the locking member opening.

4. The bottle retaining assembly of claim 3 wherein the alignment guide includes an upper pin and a lower pin spaced apart from the upper pin.

5. The bottle retaining assembly of claim 4 wherein the locking pin is positioned between the upper pin and the lower pin.

6. The bottle retaining assembly of claim 5 wherein each of the locking pin, the upper pin and the lower pin are substantially parallel to each other.

7. The bottle retaining assembly of claim 6 wherein the locking pin, the upper pin and the lower pin are substantially perpendicular to the front face of the upper support structure.

* * * * *